US005816591A

United States Patent [19]

Parker et al.

[11] Patent Number: 5,816,591

[45] Date of Patent: Oct. 6, 1998

[54] REFUSE CONTAINER

[75] Inventors: Brian G. Parker, Alto; Chadwick L. Van Sweden, Grand Rapids; Robert J. Turnbull, Greenville, all of Mich.

[73] Assignee: Cascade Engineering, Inc., Grand Rapids, Mich.

[21] Appl. No.: 593,836

[22] Filed: Jan. 30, 1996

[51] Int. Cl.[6] .......... B62B 3/12

[52] U.S. Cl. .......... 280/47.34; 220/908; 280/47.26; 280/79.5

[58] Field of Search .......... 280/47.26, 47.27, 280/47.33, 47.34, 79.11, 79.2, 79.4, 79.5; 220/908; 248/129

[56] References Cited

U.S. PATENT DOCUMENTS

| | | | |
|---|---|---|---|
| 1,141,846 | 6/1915 | Spremulli et al. . | |
| 1,542,327 | 6/1925 | Slingsby | 280/47.27 X |
| 2,382,989 | 8/1945 | Gilbert | 280/47.27 X |
| 2,699,339 | 1/1955 | Benstein | 280/47.34 X |
| 3,346,271 | 10/1967 | Parsons | 280/47.34 X |
| 3,366,397 | 1/1968 | Zeilstra et al. . | |
| 3,399,903 | 9/1968 | Bailey | 280/47.34 |
| 4,040,638 | 8/1977 | Flagg . | |
| 4,420,168 | 12/1983 | Dewing | 220/908 X |
| 4,799,699 | 1/1989 | Berfield et al. | 280/79.5 |
| 4,836,394 | 6/1989 | Glomski . | |
| 4,930,649 | 6/1990 | Moser . | |
| 5,088,750 | 2/1992 | Beese et al. . | |
| 5,131,670 | 7/1992 | Clements et al. | 280/79.5 X |
| 5,141,124 | 8/1992 | Smith et al. . | |
| 5,165,564 | 11/1992 | Prout et al. . | |
| 5,178,244 | 1/1993 | Liang . | |
| 5,230,525 | 7/1993 | Delmerico et al. | 280/79.5 X |
| 5,235,795 | 8/1993 | DeBusk . | |
| 5,261,562 | 11/1993 | Prout et al. . | |
| 5,294,137 | 3/1994 | Barber et al. . | |

*Primary Examiner*—Brian L. Johnson
*Assistant Examiner*—Michael Mar
*Attorney, Agent, or Firm*—Rader, Fishman, Grauer & McGarry

[57] ABSTRACT

A refuse container constructed of a rigid plastic material comprises a walled storage bin having substantially vertical walls extending upwardly from a bottom wall. The refuse container includes a wheel-bearing axle mounted to the lower rear portion of the storage bin and at least one wheel mounted to a front portion of the storage bin. To prevent downward deflection of the storage bin bottom wall, the refuse container also includes a brace disposed beneath the bottom wall which mounts to the rear axle and the front portion of the storage bin to reinforce the bottom wall.

12 Claims, 1 Drawing Sheet

REFUSE CONTAINER

BACKGROUND OF THE INVENTION

1. Field of the Invention

This invention relates to a refuse container, and, more particularly, to a refuse container having a reinforced base and attached wheels for easy movement.

2. Description of Related Art

Refuse containers have typically comprised a large cylindrically- or rectangularly-shaped storage bin with an attached axle carrying two rear wheels which allow the refuse container to be filled with waste material, tipped on the rear wheels and rolled to a desired disposal location. These carts have often been used to move large amounts of paper for recycling purposes. A relatively large refuse container of this type may be filled with stacks of paper which often weigh more than 300 pounds. Thus, containers of this type are often difficult to tip and control on their rear wheels. In addition, the floor of the container is often too weak to support the loads imparted such that the floor tends to buckle or collapse under heavy loading.

U.S. Pat. No. 5,261,562 to Prout et al., issued Nov. 16, 1993, discloses a refuse container having a caster wheel installed in the bottom of the container adjacent to the front wall of the container as the caster wheel permits the container to be rolled without tilting the container on its rear wheels.

U.S. Pat. No. 5,235,795 to DeBusk, issued Aug. 17, 1993, discloses a lidded receptacle provided with depressions in the bottom thereof which define four wheel wells, each adapted to receive therein an axle for a fixed-direction wheel. Whereas the axles of the wheels of the depicted receptacle are fixed, DeBusk discloses that caster-type wheels may also be employed.

U.S. Pat. No. 3,366,397 to Zeilstra et al., issued Jan. 30, 1968, discloses a rubbish-carrying hand cart having a bottom equipped with metal reinforcing skids which are disposed in slightly diverging directions and are each bent upwardly at their forward ends. The skids are designed to resist abrasion of the bottom of the cart, assume the brunt of the cart load when the cart is standing in an upright position, and to prevent wear when the cart is slid along the ground in an upright position.

U.S. Pat. No. 1,141,846 to Spremulli et al., issued Jun. 1, 1915, discloses a garbage can which is provided with a convex bottom wall. A reinforcing stand consisting of a concave body plate and integral supporting legs is adapted to receive the can so that the bottom wall of the can is spaced from the ground.

SUMMARY OF INVENTION

According to the invention, a refuse container comprises a walled storage bin having substantially vertical walls extending upwardly from a bottom wall, a wheel-bearing axle mounted to the lower rear portion of the storage bin to support the rear portion of the storage bin above the floor, and at least one wheel mounted to a front portion of the storage bin. A brace is disposed beneath the bottom wall and extends forwardly from the axle to the one or more wheels mounted on the front portion of the storage bin. The brace is mounted to the axle and the one or more front wheels mounted to the brace. Preferably, the brace is mounted to the storage bin at the front portion of the bottom wall.

In one embodiment, the brace is mounted to the storage bin at the front portion of the bottom wall and fasteners mount a wheel mounting to the brace and mount the brace to the storage bin. In another embodiment, the brace includes an upwardly extending central portion to resist downward deflection of the brace due to the weight of a load in the storage bin. Preferably, at least one wheel is a caster wheel.

BRIEF DESCRIPTION OF THE DRAWINGS

The invention will now be described with reference to the drawings wherein.

DESCRIPTION OF THE PREFERRED EMBODIMENTS

Figure 1:
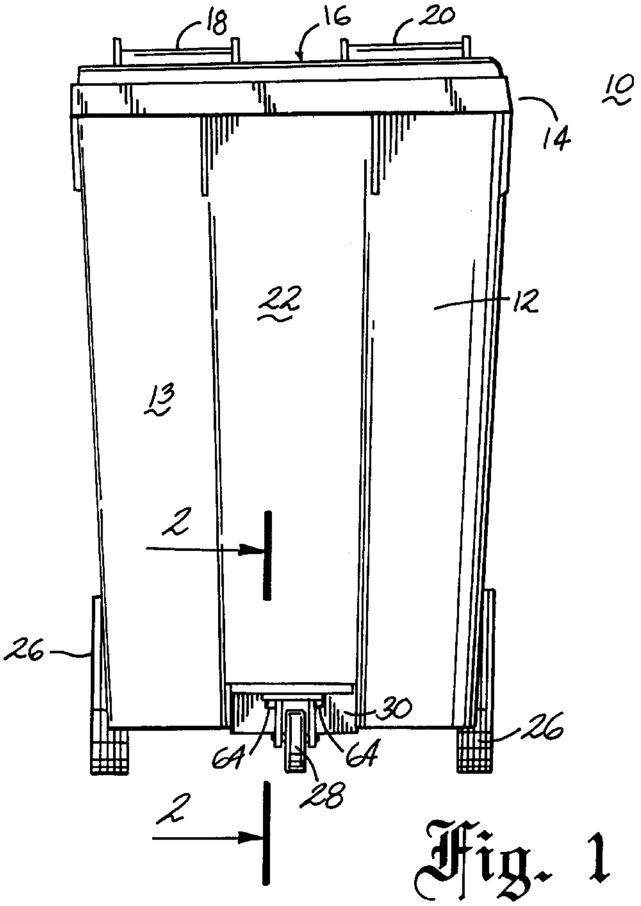
FIG. 1 is a front elevational view of a refuse container according to the invention.

Referring now to the drawings and to FIG. 1 in particular, a refuse container shown generally at 10 comprises a walled storage bin 12 formed of substantially ventrically extending walls 13 and a bottom wall 15 having rigid upper lip portion 14, hinged lid 16, handles 18, 20, and an indentation 22. The storage bin 12 is constructed of a rigid plastic material and can be of any conventional cylindrical or parallelepiped shape. Rigid upper lip portion 14 provides a brim for the closure of lid 16 and increases the strength of the storage bin 12. Handles 18, 20 are disposed along the rear edge of upper lip portion 14 and enable a user to firmly grip the handles for pushing the container. Indentation 22 comprises a vertically-disposed longitudinal recess which provides greater lateral support for the walls of storage bin 12 and which can optionally mount a lifting handle (not shown) for manually dumping the refuse container 10. The lower portion of storage bin 12 includes rear wheels 26, front wheel 28 and brace 30 which are illustrated in greater detail in FIG. 2.

Figure 2:
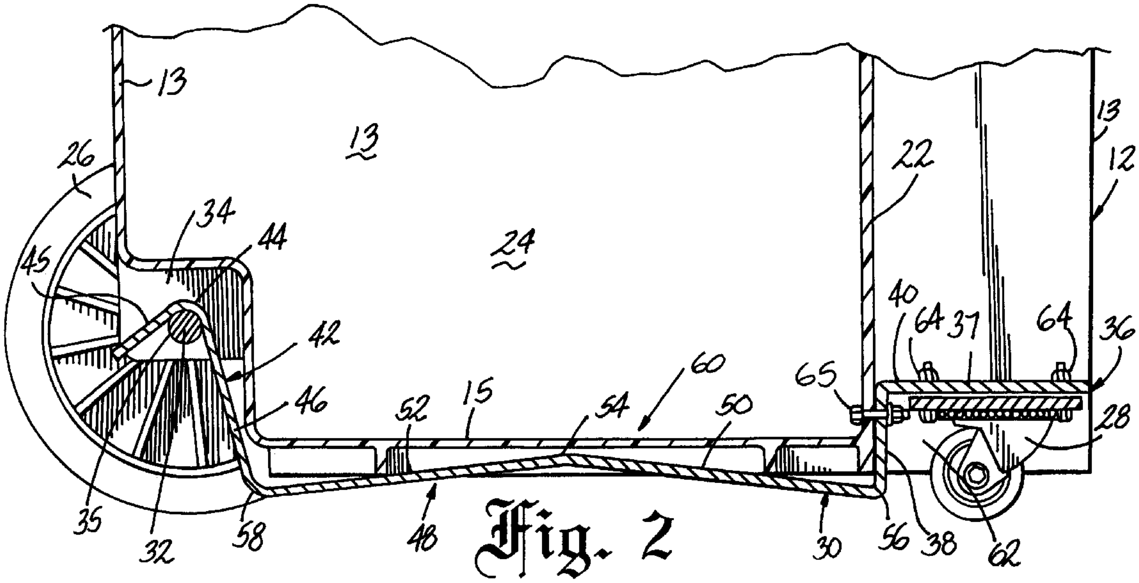
FIG. 2 is a fragmentary cross-sectional view of the refuse container along the lines 2—2 of FIG. 1.

Turning to FIG. 2, the storage bin wall 12 defines interior chamber 24 which houses the material to be disposed of. Rear wheels 26 are rotatably attached to axle 32 which is mounted to storage bin 12 through a pair of depending flanges 34 with axle openings 35. Brace 30 comprises a front flange 36, a rear flange 42 and an inverted V-shaped medial portion 48. The front flange 36 comprises a horizontally-extending wall 37 terminating at a downwardly extending vertical wall 38 at its rearward edge 40. Rear flange 42 includes a hook portion 44 and a downwardly and forwardly extending portion 46. The hook portion 44 includes a downwardly- and rearwardly-extending foot plate 45 which can serve as a foot rest for an operator while tipping the refuse container 10. The inverted V-shaped medial portion 48 comprises first and second angular walls 50 and 52 which converge at a crown point 54. The distal edges 56, 58 of angular walls 50, 52 extend to the lower edges of vertical wall 38 and angular wall 46, respectively.

In assembly, the hook portion 44 of rear flange 42 is mounted over axle 32 such that the crown portion 54 of medial portion is located under a central portion 60 of the bottom wall 15, and the front flange 36 sits within a recess 62, defined by the bottom wall 15 and the indentation 22 of storage bin 12. Front wheel 28 is mounted to the horizontally extending wall 37 of front flange 36 by threaded fasteners 64 or any other conventional fasteners. The vertical wall 38 of the front flange 36 is mounted to the bottom wall 15 of the storage bin 12 by a horizontally-extending threaded fastener 65 or any other suitable fastener. Front wheel 28 can be a conventional caster wheel which includes a mounting plate and a wheel which are rotatable about a vertical axis. In addition, several wheels may be mounted along the front portion of the brace to allow for greater support and steering control.

The brace 30 provides additional support and reinforcement to the floor of storage bin 12. As a heavy load is placed in the interior chamber 24, the central floor portion 60 of the storage bin wall 12 tends to buckle and bow downwardly. However, the central floor portion 60 will contact crown portion 54 of brace 30 such that the brace 30 will help absorb the load in interior chamber 24 and prevent further downward deflection of the central floor portion 60 and possible failure of the floor of the storage bin wall altogether. The brace 30 further provides a secure mounting situs for the caster wheel 28. Frequently, the plastic bottom does not have sufficient strength to withstand the stresses of a front caster wheel, especially when the container is heavily loaded. The brace is rigid enough and strong enough to absorb these stresses.

While the invention has been particularly described in connection with certain specific embodiments thereof, it is to be understood that this is by way of illustration and not of limitation, and the scope of the appended claims should be construed as broadly as the prior art will permit.

What is claimed is:

1. A container made from a synthetic resin material and comprising a walled storage bin having substantially vertical walls extending upwardly from a bottom wall, a pair of openings formed in a lower rear portion of the storage bin, a wheel-bearing axle received within the openings to support the rear portion of the storage bin above a floor surface, and at least one wheel mounted to a front portion of said storage bin, the improvement comprising:

an elongated metal brace disposed beneath the bottom wall and extending forwardly from the axle to the at least one wheel mounted on the front portion of the storage bin, the brace having a central portion, a forward portion and a rearward portion, the forward portion having a first leg portion extending upwardly from the central portion and a second leg portion extending forwardly from an upper end of the first leg portion with the at least one wheel mounted to the brace forwardly of the upper end of the first leg portion, and the rearward portion being formed by an upwardly extending leg portion joined to the central portion at a lower end thereof and a rearwardly extending portion at an upper end thereof supported by the axle, the central portion being in supporting relationship to and shaped to resist downward deflection of the bottom wall.

2. A brace according to claim 1 in which the brace is mounted to the storage bin at the front portion of the bottom wall.

3. A container according to claim 2 in which at least one wheel has a mounting and fasteners extend through the wheel mounting and the brace to mount the at least one wheel to the brace.

4. A container according to claim 3 in which the rearwardly extending portion has a rear hook portion which fits over the axle to mount the brace to the axle.

5. A container according to claim 4 in which there is only one wheel mounted to the front portion of the storage bin.

6. A container according to claim 4 in which the rear hook portion includes a rearwardly-extending portion which serves as a foot rest.

7. A container according to claim 2 in which the brace has an upwardly extending central portion to resist downward deflection of the brace due to the weight of a load in the storage bin.

8. A container according to claim 1 in which the at least one front wheel is a caster wheel.

9. A container according to claim 1 in which the brace has an upwardly extending central portion to resist downward deflection of the brace due to the weight of a load in the storage bin.

10. A container according to claim 1 in which the rearwardly extending portion has a rear hook portion which fits over the axle to mount the brace to the axle.

11. A container according to claim 10 in which the rear hook portion includes a rearwardly-extending portion which serves as a foot rest.

12. A container according to claim 1 in which at least one fastener extends through the brace and into the bottom wall of the storage bin to mount the brace to the storage bin.

* * * * *